United States Patent [19]
Baillie

[11] 3,752,438
[45] Aug. 14, 1973

[54] ONE PIECE ELBOW MOLD

[75] Inventor: James B. Baillie, Ancaster, Ontario, Canada

[73] Assignee: Ameron, Inc., Monterey Park, Calif.

[22] Filed: Aug. 20, 1971

[21] Appl. No.: 173,393

Related U.S. Application Data

[63] Continuation-in-part of Ser. No. 163,211, July 16, 1971, abandoned.

[52] U.S. Cl. ................ 249/184, 285/179, 425/192
[51] Int. Cl. ........................................ B28b 7/28
[58] Field of Search............. 249/175, 184, 181, 249/182, 183, 65, 63, 142, 151–154, 185; 425/393, 403, 467, 468, 51, 59, 412, 414, 415, 417, 418, 423, 447, 436 RM; 285/179

[56] References Cited
UNITED STATES PATENTS

| | | |
|---|---|---|
| 2,181,257 | 11/1939 | Arbogast ..................... 249/184 UX |
| 2,756,076 | 7/1956 | Rodriguez ..................... 285/179 X |
| 536,204 | 3/1895 | Harrington ........................ 249/184 |
| 938,024 | 10/1909 | Sigler .............................. 249/63 X |
| 2,878,727 | 3/1959 | Groot ............................. 249/184 X |
| 3,545,718 | 12/1970 | Shale .................................. 249/185 |
| 845,312 | 2/1907 | Moore ............................ 285/179 X |
| 2,503,934 | 4/1950 | Church ........................... 285/179 X |
| 2,879,848 | 3/1959 | Drummond .................... 285/179 X |

*Primary Examiner*—J. Spencer Overholser
*Assistant Examiner*—John S. Brown
*Attorney*—R. William Johnston et al.

[57] ABSTRACT

A pipe elbow with an integral female socket joint portion is formed on an internal mold. The center of curvature of the curved portion of the mold is displaced slightly outwardly of a plane perpendicular to the longitudinal axis of the socket and passing through the juncture of the socket and the curved portion to permit withdrawal of the curved portion of the mold without touching the inner wall of the socket portion.

8 Claims, 3 Drawing Figures

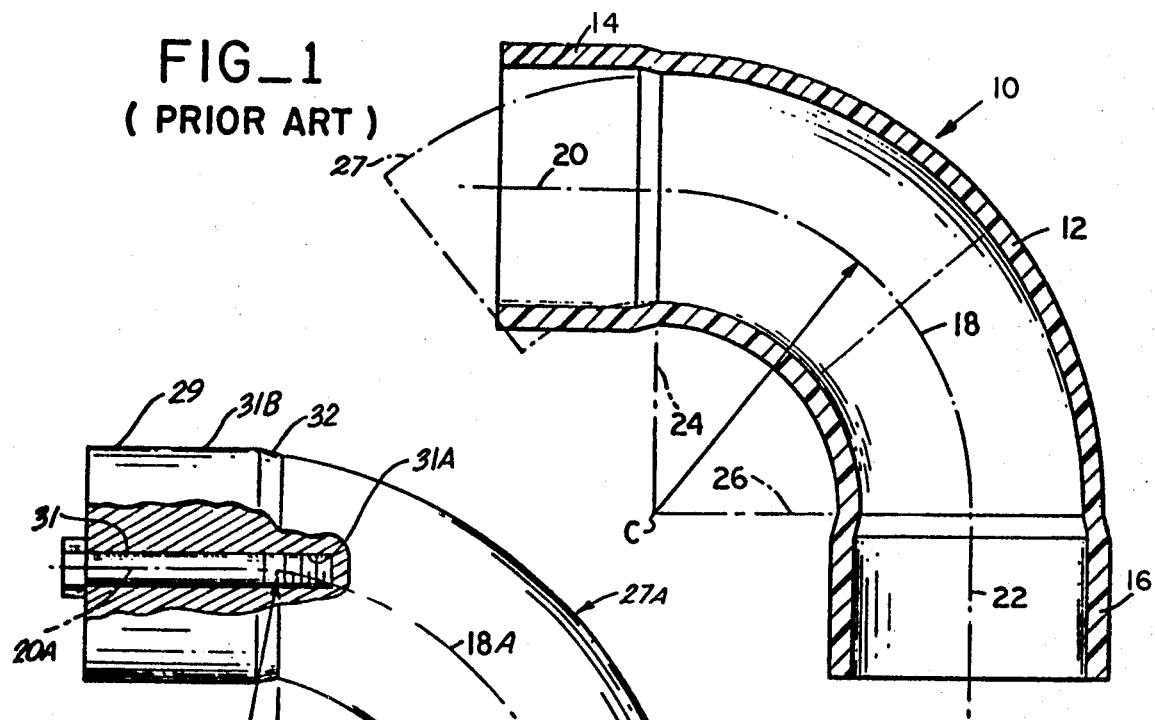
FIG_1 (PRIOR ART)
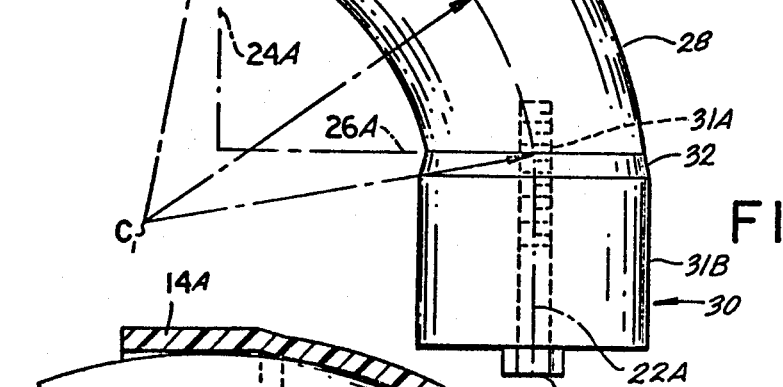
FIG_2
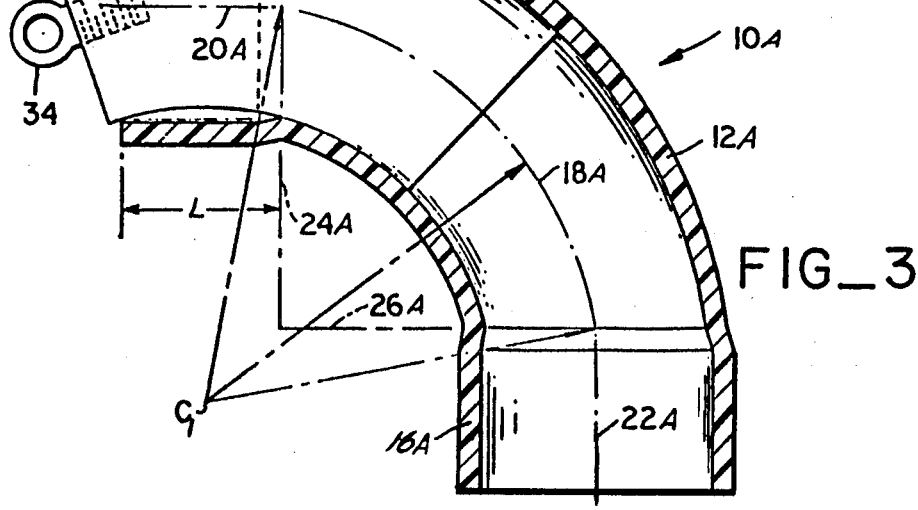
FIG_3

ONE PIECE ELBOW MOLD

CROSS-REFERENCE TO RELATED APPLICATION

This is a continuation-in-part of application Ser. No. 163,211, filed July 16, 1971, now abandoned.

BACKGROUND OF THE INVENTION

In making plastic pipe, such as fiberglass reinforced thermosetting resin pipe which has wide applications in the chemical industry, among others, the pipe is formed around a central core or mold and built up to the required thickness. Individual sections of pipe are jointed together by sliding the end of one pipe section into an enlarged portion of another section known as a socket. The two pipe sections are then jointed together by applying appropriate bonding materials in the socket area.

It is often necessary to make elbows which have a straight socket portion on at least one end of the elbow. The socket portion must be sufficiently long to provide a good bonding and bearing area for the pipe which is connected to it. The manufacture of such elbows causes considerable practical difficulty because if the conventional mold for the curved portion of the elbow is in one piece, it cannot be withdrawn without hitting the wall of the straight socket portion. Consequently, it has been customary in the past to use, for the curved portion of the pipe, either collapsible molds, which are complex and expensive, and which require a considerable amount of an operator's time to assemble and remove, or to use expendable molds, which are broken after each use. Expendable molds are typically made of plaster of paris.

SUMMARY OF THE INVENTION

In accordance with the present invention, withdrawal of a single-piece rigid mold from the curved portion of the pipe is made possible by moving the center of curvature of the curved portion to a point outside the planes which pass through the juncture of the curved and the socket portions of the pipe, and which planes are perpendicular to their respective longitudinal axes of the sockets. As a result, the straight axis of the socket and the curved axis of the curved portion are not tangential to each other, but intersect at a slight angle. For example, in a 90° elbow, the curved portion of the pipe does not curve through a full 90° arc, but rather through a somewhat lesser arc, yet the respective longitudinal axes at each end of the 90° elbow are mutually perpendicular.

In making pipe elbows of standard dimensions in accordance with this invention, only a relatively small displacement of the center of curvature from the junction plane is required. The elbows are therefore essentially indistinguishable from prior art elbows, both visually and in flow characteristics. On the other hand, the pipe elbows made according to the present invention require considerably less labor and less expensive tooling, and therefore are considerably cheaper to make.

Accordingly, this invention provides an elbow construction which permits the use of rigid, reusable curved molds which can be readily withdrawn from the finished elbow.

BRIEF DESCRIPTION OF THE DRAWINGS

FIG. 1 is a longitudinal sectional view of a conventional plastic pipe elbow, and shows in phantom line why a rigid reusable mold cannot be withdrawn from the curved portion of the pipe;

FIG. 2 is a side elevation, partly broken away, of a composite mold for manufacturing elbows in accordance with the present invention; and FIG. 3 is a longitudinal section of a pipe elbow made in accordance with this invention, showing how the curved portion of the pipe mold is withdrawn from the finished pipe.

DESCRIPTION OF THE PREFERRED EMBODIMENT

Referring to FIG. 1, a 90° pipe elbow 10 made in accordance with currently prevailing practice includes a curved portion 12 and straight socket portions 14, 16 at each end of the curved portion. Other sections of pipe (not shown) are pushed into the sockets 14, 16 and are then bonded to them.

The curved section 12 has a circular central axis 18 with a center of curvature at C. In the case of a 90° elbow, the curved section 12 extends through a full 90° arc. The socket sections 14, 16 have straight longitudinal axes 20, 22, and are joined to the curved portion of the elbow on mutually perpendicular planes 24, 26. The straight axes 20 and 22 are tangential to the curved axis 18. Consequently, the center of curvature of axis 18 is on the intersection of planes 24 and 26.

With the current practice, and rigid curved section 27 (shown only in phantom line in FIG. 1) of a conventional mold cannot be withdrawn from the elbow because the curved section of the mold strikes the wall of the straight socket portion 14. This fact, in the past, has necessitated the use of expensive collapsible curved molds, or of expendable molds which are usable only once. In either case, considerable labor is required to remove the curved section of the mold from the finished elbow.

In accordance with the invention, the prior art problem is overcome by using the composite mold 27A shown in FIG. 2. The composite mold includes a central curved section 28 with a circular central axis 18A, and sections 29 and 30 secured by bolts 31 screwed into threaded bores 31A at each end of the curved section. The outer end of each socket section is a straight cylinder part 31B with a diameter greater than the internal diameter of the elbow to be formed on the curved section of the mold by an amount equal to about twice the wall thickness of the pipe. A separate short frusto-conical section 32 is formed integrally with the inner end of each cylindrical part of the sockets and tapers inwardly to a diameter equal to that of the curved portion of the mold.

The curved portion of the mold is circular in transverse cross section and has a center of curvature $C_1$ located just outside the intersection of mutually perpendicular planes 24A and 26A which each are perpendicular to the straight longitudinal axes of respective socket sections 29 and 30, and lie in the planes where the tapered sections 32 join the respective socket sections to the curved portion of the mold. With this arrangement, the curved portion 12A of the pipe elbow 10A does not extend through a full 90° angle but rather through a slightly lesser angle. The junction planes 24A, 26A, along which the curved portion of the elbow is jointed to the socket portions 14A, 16A are still normal to the axes 20A, 22A of the socket portions 14A, 16A, but are not exactly perpendicular to the curved axes 18A, where it joins axes 20A and 22A.

The displacement of the center of curvature $C_1$ from the planes 24A, 26A need not be great. With the usual elbow dimensions encountered in normal use, the displacement is so slight as to prevent ready detection of the shortening of the curved portion arc either by visual inspection or by the fluid flow characteristics of the elbow.

The plastic pipe elbow 10A with conventional socket portions 14A and 16A at each end is formed on the composite mold shown in FIG. 2 by conventional techniques. After the plastic has set, bolts 31 are unscrewed, and the socket sections 29 and 30 of the composite mold are removed, leaving only the curved section 28 of the mold in the elbow. A conventional eye bolt 34 is screwed into one of the threaded recesses 31A and used to pull the curved section of the mold from the elbow.

As shown in FIG. 3, the curved section of the mold slides out of the elbow without touching the inside wall of the socket portion 14A because of the relatively long radius of curvature of the curved section 28 of the mold. The curvature of the curved section of the mold is such that a chord beginning at the intersection of plane 24A and the innermost limit of the curved section 28 of the mold, and extending in the plane of FIG. 3 to the end of the inner extremity of inner wall of socket portion 14A, is just enough longer than L, the length of the socket portion, so the inner surface of the curved section of the mold does not contact the socket wall when the mold is withdrawn from the elbow. However, the curvature of the curved section of the mold is not so great that the outer surface of the mold strikes the socket wall when mold is withdrawn.

Thus, the modified curved section of the mold of this invention makes it possible to manufacture a pipe elbow with a socket section from an internal mold with a rigid curved portion that can be reused, and which does not have to be collapsed or disassembled or reassembled. This reduces the amount of labor required to make the elbow, and also reduces the cost of the tooling or molds used to make the product.

The mold and pipe elbow of this invention are not limited to 90° elbow because the invention can be used to make molds and elbows of any desired angle so long as the center of curvature of the curved portion of the elbow is sufficiently displaced outwardly from the plane perpendicular to the straight axis of the socket and passing through the point where the socket joins the curved portion of the elbow. Moreover, although the preferred embodiment includes sockets at each end of the elbow, an elbow can be made in accordance with this invention to include a socket at only one end, the other end of the elbow being formed with whatever shape is required for the particular application of that product.

I claim:

1. A rigid internal mold for forming a pipe elbow with a curved portion joined to a socket portion, the mold comprising:
   a. a curve-forming section having a first end defined by a first plane, a second end defined by a second plane, and a circular axis for forming the curved portion of the elbow,
   b. the curve-forming section being substantially circular in transverse cross-section and having a substantially constant diameter continuous between the first end the second end, and
   c. a socket-forming section having a straight axis for forming the socket portion of the elbow,
   d. the socket-forming section being joined to the first end of the curve-forming section along a planar joint defined by a first plane,
   e. the center of curvature of the circular axis being displaced from the intersection of the first and second planes on the side of said intersection remote from the curve-forming section,
   f. the amount of said displacement being sufficient to allow the curve-forming section of the mold to clear the inner wall of the socket portion of the elbow when the curve-forming section of the mold is withdrawn from the curved portion of the elbow.

2. The mold according to claim 1 in which the socket-forming section is releasably secured to the curve-forming section.

3. The mold according to claim 1 in which the socket-forming section is generally circular in transverse cross-section, and the socket-forming section has an outer diameter generally equal to the outer diameter of the curve-forming section plus about twice the thickness of the elbow wall.

4. The mold according to claim 1 in which the curve-forming section is an elongated one-piece member.

5. The mold according to claim 1 including a second socket-forming section having a straight axis for forming a second socket portion of the elbow, the second socket-forming section being joined to the second end of the curve-forming section along a planar joint defined by the second plane.

6. The mold according to claim 5 in which the second socket-forming section is releasably secured to the curve-forming section.

7. The mold according to claim 6 in which the curve-forming section is an elongated one-piece member.

8. The mold according to claim 1 in which the first and second planes are substantially mutually perpendicular, and in which the radius of curvature of the circular axis is slightly greater than the radius defined by a line extending from the point of intersection of the two planes to the axis of the curve-forming section.

* * * * *

PO-1050
(5/69)

UNITED STATES PATENT OFFICE
CERTIFICATE OF CORRECTION

Patent No. 3,752,438         Dated August 14, 1973

Inventor(s)    JAMES B. BAILLIE

It is certified that error appears in the above-identified patent and that said Letters Patent are hereby corrected as shown below:

[57] Abstract should read as follows

--A pipe elbow with an internal female socket joint is formed by a one-piece internal mold. The curved portion of the mold has a circular axis, a first end defined by a first plane, and a second end defined by a second plane intersecting the first plane. The center of curvature of the curved portion of the mold is displaced from the intersection of the first and second planes on the side of the intersection remote from the curved portion of the mold. The displacement from the point of intersection is sufficient to allow the curved portion of the mold to clear the inner wall of the elbow socket when the curved portion of the mold is withdrawn from the curved portion of the elbow.--

Col 4, claim 1, line 13, after "end" insert --and--;
line 18, change "a" to --the--.

PO-1050
(5/69)

UNITED STATES PATENT OFFICE
CERTIFICATE OF CORRECTION

Patent No. __3,752,438__  Dated __August 14, 1973__

Inventor(s) __JAMES B. BAILLIE__

It is certified that error appears in the above-identified patent and that said Letters Patent are hereby corrected as shown below:

Col. 1, line 12, "jointed" should read --joined--;

line 15, "jointed" should read --joined--.

Col. 2, line 66, "jointed" should read --joined--.

Col. 3, line 2, "axes" should read -- axis -- ;

line 45, "elbow" should read --elbows--

Signed and sealed this 22nd day of January 1974.

EDWARD M. FLETCHER, JR.       RENE D. TEGTMEYER
Attesting Officer      Acting Commissioner of Patents